June 6, 1967 H. B. PALMER ET AL 3,323,983
APPARATUS FOR EMBOSSING MULTI-PLY PAPER SHEETS
Filed Sept. 8, 1964 2 Sheets-Sheet 1
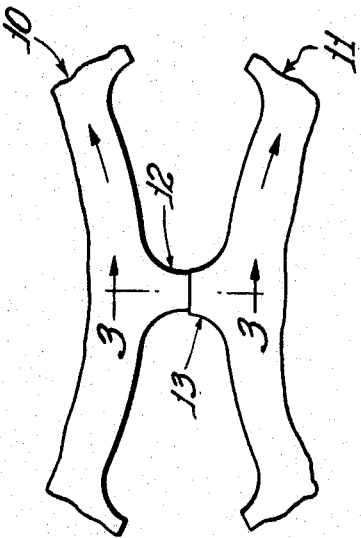
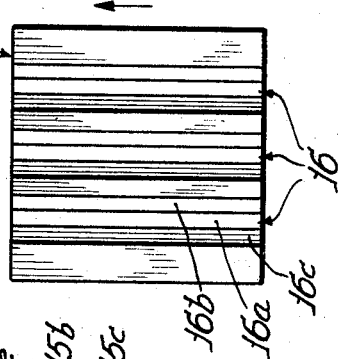
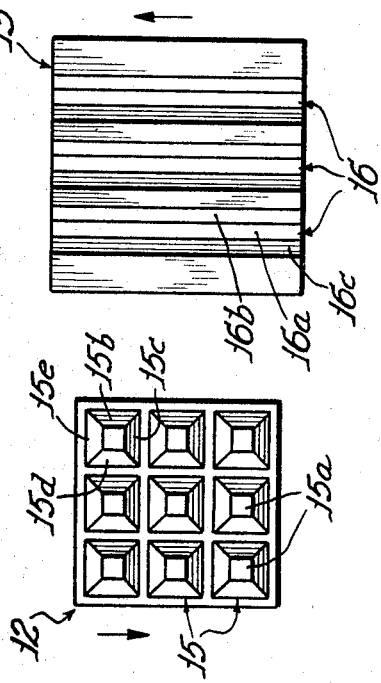
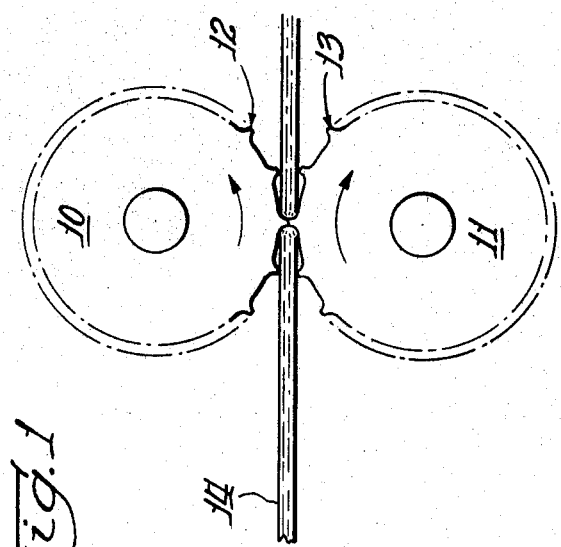
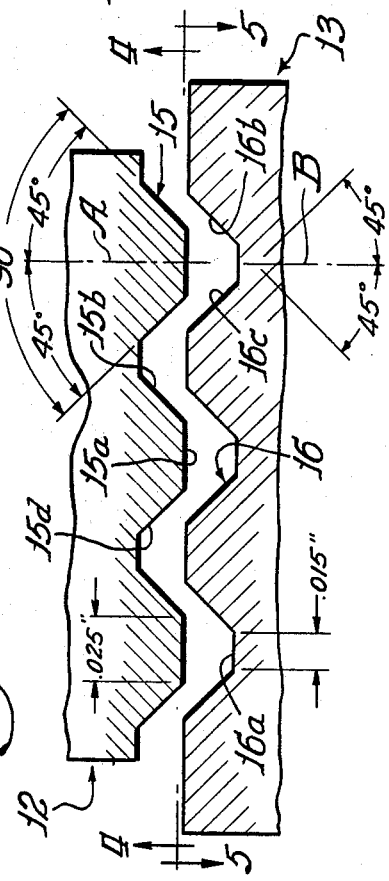

June 6, 1967 H. B. PALMER ETAL 3,323,983
APPARATUS FOR EMBOSSING MULTI-PLY PAPER SHEETS
Filed Sept. 8, 1964 2 Sheets-Sheet 2
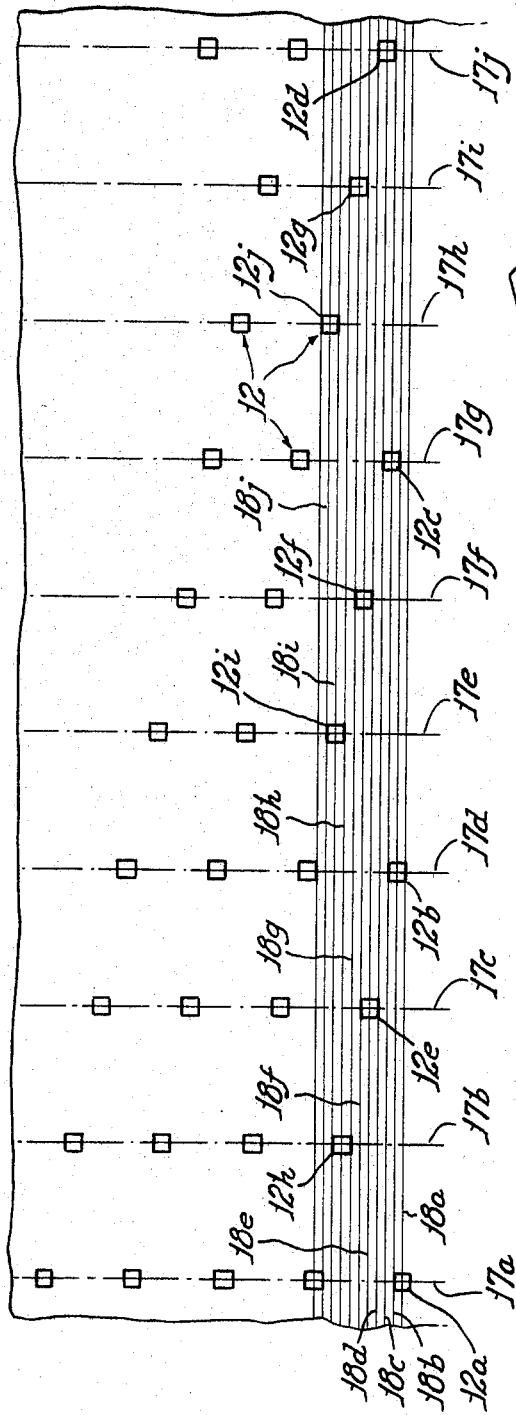
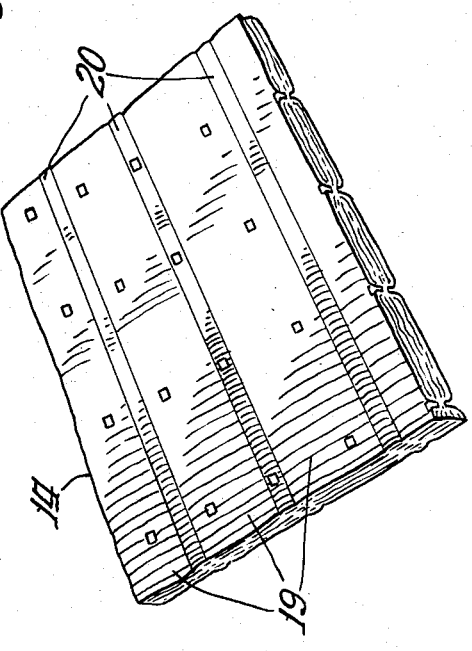

United States Patent Office 3,323,983
Patented June 6, 1967

3,323,983
APPARATUS FOR EMBOSSING MULTI-PLY PAPER SHEETS
Howard B. Palmer, Sarasota, Fla., and Frank E. Davis, Neenah, and James T. Gresham, Appleton, Wis., assignors to Kimberly-Clark Corporation, Neenah, Wis., a corporation of Delaware
Filed Sept. 8, 1964, Ser. No. 394,871
6 Claims. (Cl. 162—362)

The invention relates to papermaking machinery and more particularly to embossing mechanism suitable for fixing together plies of thin creped paper or wadding which, due to its high bulk, is particularly useful for packing purposes. Still more particularly, the invention relates to embossing mechanism which is particularly suitable for embossing together lightweight paper plies, at least portions of which are creped to only a slight extent as distinguished from tissue which is finely creped.

It has previously been proposed to provide rotatably mounted embossing discs or wheels operable to emboss finely creped paper plies for bonding them together by running the material between a driven cylindrical roll and the discs. Some of these discs have been composed of disc portions, which are continuous on their periphery, and notched disc portions positioned along side of and in contact with the continuous disc portions for bonding the plies of material without unduly stretching or elongating the material along the lines of embossing. Embossing wheels of this prior type, however, were not found to be entirely satisfactory to bond together the plies of coarsely creped paper tissue or the coarsely creped portions of differentially creped tissue paper (such as is, for example, described in U.S. Patent 2,996,424, issued on Aug. 15, 1961, to Edward H. Voigtman, Charles A. Lamb and Harold F. Donnelly).

It is, accordingly, an object of the invention to provide improved embossing wheels and, more particularly, improved peripheral patterns on such wheels which cooperate to give good ply attachment of uncreped paper tissue or coarsely creped paper tissue. More particularly, it is an object to provide such improved patterns including pegs on two complementary embossing wheels which are adapted to engage with each other. It is contemplated that the pegs of one wheel shall have bosses on the ends of the pegs and that the other wheel shall have corresponding depressions in the ends of its pegs which mate, so as to provide very high unit pressures for good ply attachment of paper tissue without substantial cutting of the material.

The invention consists of the novel constructions, arrangements and devices to be hereinafter described and claimed for carrying out the above stated objects, and such other objects as will be apparent from the following description of a preferred form of the invention, illustrated with reference to the accompanying drawings, wherein:

FIG. 1 is a side elevational view of a pair of embossing rolls embodying the principles of the invention and provided with pegs that engage with each other to emboss tissue paper passing between the rolls;

FIG. 2 is a fragmentary side elevational view on an enlarged scale of the pair of rolls;

FIG. 3 is a cross sectional view on an enlarged scale taken on line 3—3 of FIG. 2 and showing a pair of pegs on the two rolls, the pegs being illustrated slightly out of engagement to show the manner in which mating portions of the pegs align with each other;

FIGS. 4 and 5 are plan views of the mating ends of a pair of pegs of the two rolls, being taken on a reduced scale and respectively on lines 4—4 and 5—5 of FIG. 3 in the direction indicated;

FIG. 6 is a developed plan view of one of the rolls showing the pattern in which the pegs are disposed on the roll; and, FIG. 7 is a perspective view of a multi-ply differentially creped tissue product with which the embossing wheels of the invention are particularly useful.

Like characters of reference designate like parts in the several views.

Referring now to the drawings, the illustrated embossing apparatus may be seen to comprise a pair of embossing wheels 10 and 11 which are rotatably disposed on parallel axes. The roll 10 is provided with spaced pegs 12 on its periphery, and the roll 11 is provided with spaced pegs 13 on its periphery. The rolls 10 and 11 are driven in synchronism by any suitable driving mechanism (not shown) so that the ends of the pegs 12 abut and mate with the ends of the pegs 13 as the two rolls 10 and 11 rotate. A plurality of superposed plies of paper tissue 14 are passed between the rolls 10 and 11 as they rotate; and, as will hereinafter appear, the pegs 12 and 13, as they come practically into contact with each other, highly compress and fuse the fibers of the tissue plies together and thereby emboss the tissue and fasten the tissue plies together.

Each of the pegs 12 is formed with bosses 15 on its end. Each boss 15 comprises a substantially flat central portion 15a and outwardly slanted or tapered side portions 15b, 15c, 15d and 15e. In the illustrated form of the invention, each peg 12 has nine bosses which are laid out in three rows each way. The bosses 15 take up most of the surface on the end of the peg 12 and are spaced slightly from each other and from the edges of the peg. Each of the pegs 13 is formed with grooves 16 in its end, each of which extends circumferentially of the roll 11, although the grooves 16 instead might, if desired, be made to extend axially of the roll 11. Each of the grooves 16 is formed with a substantially flat base portion 16a and outwardly flaring side portions 16b and 16c.

Referring to FIG. 3 which shows a peg 12 and a mating peg 13 in end-to-end alignment, it will be observed that the flat central portions 15a of the bosses 15 are wider than are the base portions 16a of the grooves 16. The portions 15a may, for example, be .025 inch wide, and the base portions 16a may, for example, be .015 inch wide. The depth of the grooves 16, for example, may be .025 inch; and the bosses 15 may have a height substantially the same. The slanted portions 15b and 15d of the bosses 15 may be seen to extend in the same direction as the flaring side portions 16b and 16c. The outwardly tapering portions 15b and 15d in the illustrated embodiment extend at 90° with respect to each other, and the outwardly flaring sides 16b and 16c of the grooves 16 extend at the same angle with respect to each other. The outwardly tapering side surfaces 15b and 15d in the illustrated embodiment may each be seen to extend at an angle of 45° with respect to a plane A which is normal to the axis of the roll 10, and the outwardly flaring side surfaces 16b and 16c each extends at the same angle of 45° with respect to a plane B which is normal to the axis of the roll 11. The base surfaces 15a and 16a are substantially flat and are normal to the planes A and B respectively. Surfaces 15b and 16b thus extend parallel to each other and are in very close proximity to each other, and the same is true of the surfaces 16b and 16c, with the bosses 15 thus meshing and mating with the grooves 16 as the rolls 10 and 11 rotate. Since, in the illustrated embodiment, the flat central portions 15a of the bosses 15 are substantially wider than the base portions 16a of the grooves 16, only parts of the tapering sides 15b and 15d engage with the flaring groove sides 16b and 16c and the base surfaces 16a and 15c are substantially spaced. With the flat central portions 15a being .025 inch in width and the base portions 16a being .015 inch in width, slightly over one-half of the tapering surfaces 15b and 15d mesh and engage with the flaring groove surfaces 16b and 16c. In the illustrated embodiment, the grooves 16 have an overall width of approximately .05 inch; and the bosses 15, including the tapering portions 15b and 15d, have an overall width and length of about .06 inch (both axially and also circumferentially of the roll 10).

Preferably the pegs 13 are larger in cross sectional size than are the pegs 12. The pegs 13, may, for example, be square in cross section with sides of 5/16 inch; and the pegs 12 may in this case be square in cross section with sides of 1/4 inch. Therefore, the grooves 16 are longer than are three of the bosses 15 taken together, and this arrangement allows a slight relative axial adjustment of the rolls 10 and 11 while still maintaining full engagement of the bosses 15 within the grooves 16.

The rolls 10 and 11 may vary within wide limits in diameter and length. Such rolls may, for example, be about six feet long; and they may, for example, be about seven or eight inches in diameter. In one particular installation, the rolls 10 and 11 were 6 17/32 inchs in diameter exclsuive of the pegs, and the roll diameter including the pegs was 7 1/8 inches. Thus, the pegs had heights of about 19/32 inch.

The pegs 12 and 13 are formed on the rolls 10 and 11 in regular patterns so as to assure that there is a continuous contact of the pegs 12 and 13 together as the rolls rotate. With this arrangement of pegs, it is contemplated that one or more pegs, such as for example, four pegs, shall be in contact at all times spaced only by the compressed paper tissue plies between the pegs. The patterning arrangement for the pegs 12 on the roll 10 is shown in FIG. 6. The illustrated pegs 12 are disposed in ten spaced planes 17a to 17j which extend through the axis of the roll 10. Circumferentially of the roll 10, the pegs have their centers passing through patterns of ten spaced axial lines 18a to 18j on the perphery of the roll. The particular pegs 12a to 12j have their centers disposed respectively on the lines 18a to 18j, as will be noted. With this arrangement, there is continuous contact of the pegs 12 on the pegs 13.

Although the embossing rolls 10 and 11 may be successfully used with many different types of plied products for embossing the plies together, they are particularly useful for embossing creped tissue product of the type illustrated in FIG. 7. This type of product previously has more or less resisted efforts to successfully attach the plies of it together. The product illustrated in FIG. 7 is a multi-ply, differentially creped tissue mat comprising a plurality of superposed cellulosic tissue webs or sheets 14. The number of plies utilized in the product may be two or more depending upon the particular application for which the product is to be used; however, it is contemplated that the number of plies may be approximately twenty or more, particularly when the tissue product is utilized for certain applications, such as packing, padding, cushioning and insulation, which require low density and high bulk. The individual sheets in the product may be formed tissue webs having a basis weight on a bone-dry basis before differential creping of between about 3.5 pounds and about 15 pounds per ream of 2,880 square feet, for example.

Each of the webs 14 has a series of alternately coarsely creped areas 19 and more finely creped areas 20. The alternating coarsely creped areas 19 and more finely creped areas 20 provide alternating puffed and flat areas, which gives the product unique properties. The fine crepes in the flat areas function as stabilizers holding the arches of the coarse crepes in place and enabling the latter to act as structural members to provide the product with its stable bulk characteristics. Preferably, as shown in FIG. 7, these areas are a series of rather broad parallel bands with the finely creped and coarsely creped areas alternating. This product is illustrated more in detail in the above mentioned Voigtman et al. Patent 2,996,424; and the method for making the product also is described in this patent, including the application of a drier release agent in spaced jets on to the exterior surface of a Yankee drier from which the product is creped.

This multi-ply product has in the past resisted ply attachment by embossing, due to the presence of the coarsely creped areas 19 which do not have very many of the paper fibers raised and thrust out from the plane of the paper tissue that would result from fine creping, so that the coarsely creped areas 19 approximate paper which has had no creping, and due to the fact also that some of the drier release agent remains with the tissue particularly in the coarsely creped areas 19.

The differentially creped paper tissue plies 14 as superposed on each other are passed between the rolls 10 and 11 in order to emboss the plies together. The bosses 15 of the pegs 12 mate with the grooves 16 in the pegs 13, and the tapering surfaces 15b and 15d of the pegs 12 extend parallel to and are very nearly in contact with the flaring surfaces 16b and 16c of the grooves 16, there being only about .002 inch clearance between these surfaces using the twenty ply tissue previously referred to. The tapering surfaces 15b and 15d on the pegs 12 act in conjunction with the opposite flaring surfaces 16b and 16c of the pegs 13 to apply very high unit pressures on the tissues causing the fibers of the plies 14 between these surfaces to interlock and to be reduced to a plastic, with the individual paper fibers losing their identity, thereby knitting the plies together between these surfaces. In providing this ply attachment, there is a sliding action of the surfaces 15b and 15d on the surfaces 16b and 16c as the individual pegs 12 and 13 come together with rotation of the rolls 10 and 11, helping in producing this knitting of the plies together, which sliding action could not be obtained if the ends of the pegs 12 and 13 were flat or were formed as parts of cylinders coaxial with the rolls 10 and 11. Very high peak pressures of 180,000 to 250,000 pounds per square inch may be obtained with the illustrated construction, assuming that forces of only 100 pounds are applied on rolls 10 and 11, and these high peak pressures along with the sliding action of the surfaces 15b and 15d on the surfaces 16b and 16c are effective to firmly attach the plies together.

In view of the fact that the individual pegs 12 and 13 are provided on the rolls 10 and 11, there may be a substantial clearance between the foundation surfaces of the embossing rolls so that the rolls do not debulk the product. For rolls of the particular dimensions mentioned above, this clearance would be two times 19/32 inch or 1 3/16 inches.

Due to the fact that the grooves 16 are open on their ends, paper dust and fiber do not accumulate within the grooves and prevent a full and continuing engagement of the tapering boss sides 15b and 15d with the flaring groove sides 16b and 16c, which give good ply attachment due to engagement. If the grooves 16 were either closed on their ends or were made in lengths to correspond to the individual bosses 15, a very severe buildup and filling of impacted fiber in the closed grooves could be expected in a very short time to the point that severe pounding between the rolls 10 and 11 with ultimate roll damage, along with poor ply attachment, would take place. The dust moves easily out of the open ended grooves 16 during the rotation of the roll 11, particularly if the grooves 16 are disposed in the circumferential direction, as illustrated. If desired, a brush may be applied on the pegs 13 to forcibly remove the dust from the grooves 16 during rotation of the roll 11. Due to the fact that the flat portions 15a of the bosses 15 are greater in width than are the bases 16a of the grooves 16, the surfaces 15a and 16a never come in contact and have very little or no pressure between them; and, therefore, there is a minimization of densification of any fiber that tends to become entrapped between these surfaces, making removal, as by brushing during rotation of the roll 11, a minor problem. It has been found, incidentally, that with the open grooves 16 on the ends of the pegs 13 and with the male, patterned, pyramidal bosses 15 on the pegs 12 fitting into the grooves, the level of ply attachment is substantially as good as with a male-female pattern in which the grooves 16 are closed at their ends and also closed intermediate their ends to form depressions corresponding to the pyramidal bosses 15, so that there are a plurality of full pyramidal profiles on the end of each peg 12 and 13.

For longevity of the rolls 10 and 11, it is necessary to harden the mating ends of the pegs 12 and 13. This may be done, for example, by lowering each of the rolls axially through a circular burner and into a quenching bath located below the burner. Due to the fact that the individual pegs 12 and 13 are provided on the rolls in lieu, for example, of concentric rings having the mating bosses and grooves on their peripheral surfaces, small movements of the pegs with respect to each other may occur without fracture of any of the peripheral surfaces of the rolls 10 and 11 during the hardening operation.

Advantageously, the small pitch pyramidal patterns comprising the bosses 15 and grooves 16 and the matching tapered surfaces 15b and 15d and flaring surfaces 16b and 16c, due to their high unit pressures and sliding engagement, produce better fiber-to-fiber bonding at lower total loads, and provide superior levels of ply attachment, than are possible with flat surface embossing. Even the coarsely creped areas 19 of the plies 14, which resist attachment as previously described, are fixed together utilizing the pegged embossing rolls of the invention.

We wish it to be understood that the invention is not to be limited to the specific constructions, arrangements and devices shown and described, except only insofar as the claims may be so limited, as it will be understood to those skilled in the art that changes may be made without departing from the principles of the invention.

What is claimed is:

1. In apparatus for embossing together the plies of a multi-ply sheet product, the combination of a pair of rolls rotatably disposed on parallel axes, each of said rolls having a plurality of pegs on its periphery with the pegs of the rolls being so spaced on the rolls that the pegs of one of the rolls have end-to-end alignment with and closely approach the pegs of the other roll to compress together the plies of the multi-ply product as it is passed between the rolls as the rolls rotate, the ends of the pegs on one roll being formed with grooves and the ends of the pegs on the other roll being provided with bosses that mate with the grooves as the rolls rotate and said grooves being open ended to prevent the accumulation of dust in the grooves.

2. In apparatus for embossing together the plies of a multi-ply sheet product, the combination of a pair of rolls rotatably disposed on parallel axes, each of said rolls having a plurality of spaced pegs on its periphery with the pegs of the rolls being so spaced that the pegs of one of the rolls have end-to-end alignment with and closely approach the pegs of the other roll to emboss the multi-ply product passed between the rolls as the rolls rotate, the ends of the pegs on one roll being formed with grooves having sides that flare outwardly and the ends of the pegs on the other roll being provided with bosses that have tapering sides extending outwardly, the sides of said bosses and grooves extending parallel to each other and being in close proximity when a peg of one roll is in end-to-end alignment with a peg of the other roll so that the groove and boss sides compress the plies of the sheet product together as the rolls rotate, said grooves being open ended to prevent the accumulation of dust in the grooves.

3. In apparatus for embossing together the plies of a multi-ply sheet product, the combination of a pair of rolls rotatably disposed on parallel axes, each of said rolls having a plurality of spaced pegs on its periphery with the pegs of the rolls being spaced so that the pegs of one of the rolls have end-to-end alignment with and closely approach the pegs of the other roll to emboss the multi-ply product passed between the rolls as the rolls rotate, the ends of the pegs on one roll being formed with open ended continuous grooves having side surfaces that flare outwardly at an angle with respect to a plane normal to the axis of the roll and having a flat base surface extending between the side surfaces, the ends of the pegs on the other roll being provided with bosses that have side surfaces extending at the same angle to a plane normal to the axis of said other roll as said first mentioned angle and having flat top surfaces which are wider than said flat base surfaces axially of said respective rolls whereby the bosses and grooves mate as the rolls rotate with the base and top surfaces being substantially spaced and with the side surfaces being parallel and in very close proximity so as to compress and bond the plies of the product together.

4. In apparatus for embossing together the plies of a multi-ply sheet product, the combination of a pair of rolls rotatably disposed on parallel axes, each of said rolls have a plurality of spaced pegs on its periphery with the pegs of the rolls being so spaced so that the pegs of one of the rolls have end-to-end alignment with and closely approach the pegs of the other roll to emboss the multi-ply product passed between the rolls as the rolls rotate, the ends of the pegs of one roll being formed with open ended grooves which extend circumferentially of the roll and which have outwardly flaring side surfaces extending at an angle with respect to a plane normal to the axis of the roll and have base surfaces extending between the side surfaces, the ends of the pegs on the other roll being provided with a plurality of bosses disposed in rows with each of the bosses being provided with outwardly tapering side surfaces which extend with respect to a plane normal to the axis of said other roll at the same angle as said first mentioned angle and the bosses being provided also with flat top surfaces which are wider than said base surfaces axially of said respective rolls whereby the bosses and grooves mate as the rolls rotate with the base and top surfaces being substantially spaced and with the side surfaces being parallel and in very close proximity so as to compress and bond the plies of the product together.

5. In apparatus for embossing together the plies of a multi-ply sheet product, the combination of a pair of rolls rotatably disposed on parallel axes, each of said rolls having a plurality of spaced pegs on its periphery with the pegs of the rolls being so spaced that the pegs of one of the rolls mate with and have end-to-end alignment with and closely approach the pegs of the other roll to emboss the multi-ply sheet product passed between the rolls as the rolls rotate, the end of one peg of each mating pair of pegs being formed with a depression with sides that flare outwardly and the end of the mating peg being provided with a boss that has tapering sides extending outwardly at the same angles as said sides of the said depression so that the sides of each said boss and the sides of the mating said depression extend substantially parallel to each other when the pegs are in end-to-end alignment, said bosses each being truncated and said sides of said bosses and depressions being in close proximity to each other but with the truncated end of the bosses being substantially spaced from the bottoms of the mating depressions whereby said sides of said depressions and bosses on said pegs compress and bond the plies of the sheet product together as the rolls rotate.

6. In apparatus for embossing together the plies of a multi-ply sheet product, the combination of a pair of rolls rotatably disposed on parallel axes, each of said rolls having a plurality of spaced pegs on its periphery with the pegs of the rolls being so spaced that the pegs of one of the rolls mate with and have end-to-end alignment with and closely approach the pegs of the other roll to emboss the multi-ply sheet product passed between the rolls as the rolls rotate, the end of one peg of each pair of mating pegs being formed with a depression with opposite sides that flare outwardly and with a base surface extending between the sides and the end of the mating peg being provided with a boss that has opposite sides tapering outwardly and being truncated with a top surface extending between the sides, said sides of said boss extending at the same angles as said sides of said depression so that the sides of each said boss and the sides of the mating depression extend substantially parallel to each other when the pegs are in end-to-end alignment, the width of said top surface between the tapering sides of each said boss being greater than the width of said base surface between the flaring sides of the mating said depression so that said sides of said boss and depression are in close proximity and said top surface of said boss is substantially spaced from said base surface of the mating depression when a peg of one roll is in end-to-end alignment with a peg of the other roll and said sides of said depressions and bosses compress and bond the plies of the sheet product together.

References Cited
UNITED STATES PATENTS

| | | | |
|---|---|---|---|
| 1,941,783 | 1/1934 | Bahr | 162—362 X |
| 1,945,024 | 1/1934 | Coil et al. | 162—116 |
| 1,995,057 | 3/1935 | Ellis | 156—595 X |
| 2,464,301 | 3/1949 | Francis | 156—595 X |
| 3,047,454 | 7/1962 | Marcalus | 162—117 |
| 3,051,608 | 8/1962 | Gordon | 156—585 X |

DONALL H. SYLVESTER, *Primary Examiner.*

S. LEON BASHORE, *Examiner.*